(12) United States Patent
Sakata et al.

(10) Patent No.: US 8,189,290 B2
(45) Date of Patent: May 29, 2012

(54) SPINDLE MOTOR AND DISK DRIVE APPARATUS USING THE SAME

(75) Inventors: Yasuhiro Sakata, Kyoto (JP); Yuya Saito, Kyoto (JP); Takehito Tamaoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 369 days.

(21) Appl. No.: 12/580,319

(22) Filed: Oct. 16, 2009

(65) Prior Publication Data

US 2010/0142359 A1 Jun. 10, 2010

(30) Foreign Application Priority Data

Dec. 8, 2008 (JP) ................................ 2008-312288

(51) Int. Cl.
*G11B 19/20* (2006.01)
(52) U.S. Cl. .................................................... 360/99.08
(58) Field of Classification Search ................ 360/99.08
See application file for complete search history.

(56) References Cited

U.S. PATENT DOCUMENTS

| | | | |
|---|---|---|---|
| 4,965,476 A | 10/1990 | Lin | |
| 6,914,358 B2 * | 7/2005 | Tokunaga et al. | 310/90 |
| 6,920,013 B2 | 7/2005 | Nishimura et al. | |
| 6,980,394 B2 * | 12/2005 | Inoue et al. | 360/99.08 |
| 7,008,109 B2 | 3/2006 | Gomyo et al. | |
| 7,088,023 B1 * | 8/2006 | Gomyo et al. | 310/90 |
| 7,118,278 B2 | 10/2006 | Gomyo et al. | |
| 7,391,139 B2 | 6/2008 | Yamamoto | |
| 7,460,334 B2 * | 12/2008 | Yonei et al. | 360/99.08 |
| 7,830,049 B2 * | 11/2010 | Yoneda et al. | 310/51 |
| 2003/0168923 A1 | 9/2003 | Gomyo et al. | |
| 2004/0190410 A1 | 9/2004 | Kuwajima et al. | |
| 2006/0082229 A1 | 4/2006 | Xu et al. | |

FOREIGN PATENT DOCUMENTS

| | | |
|---|---|---|
| JP | 03-060355 | 3/1991 |
| JP | 08-115562 | 5/1996 |
| JP | 2813890 | 8/1998 |
| JP | 2001-332013 | 11/2001 |
| JP | 2002-262523 | 9/2002 |
| JP | 2003-299302 | 10/2003 |
| JP | 2005-003115 | 1/2005 |
| JP | 2006-194400 | 7/2006 |

\* cited by examiner

*Primary Examiner* — Mark Blouin
(74) *Attorney, Agent, or Firm* — Keating & Bennett, LLP

(57) ABSTRACT

A spindle motor includes a shaft arranged concentric with as a central axis and extending in a vertical direction, a rotor unit arranged to rotate about the central axis, a stator including a base member and a magnetic member fixed to the base member and axially opposed to the magnet. The magnetic member includes an opposing portion axially opposed to the magnet so that a magnetic attracting force is generated between the opposing portion and the magnet and a protrusion portion protruding downwards from the opposing portion. The base member includes a recess portion, and the protrusion portion of the magnetic member is fixed within the recess portion.

19 Claims, 7 Drawing Sheets

SPINDLE MOTOR AND DISK DRIVE APPARATUS USING THE SAME

BACKGROUND OF THE INVENTION

1. Field of the Invention

The present invention relates to a spindle motor for rotating a disk about a central axis and a disk drive apparatus provided with the spindle motor.

2. Description of the Related Art

A hard disk drive or an optical disk drive is equipped with a spindle motor for rotating a disk about a central axis. The spindle motor includes a housing, a stator unit fixed to the housing and a rotor unit arranged to hold a disk and rotate together with the disk.

There is conventionally known a spindle motor of the type including a magnetic attraction plate attached to the upper surface of a stator unit. The magnetic attraction plate attracts a rotor unit toward the stator unit by a magnetic attracting force generated between itself and a rotor magnet fixed to the rotor unit. The conventional spindle motor provided with the magnetic attraction plate is disclosed in, e.g., Japanese Patent Laid-open Publication No. 2005-003115.

In the conventional spindle motor provided with the magnetic attraction plate, the planar portion of the magnetic attraction plate is bonded to the flat surface of a base frame. A strong magnetic attracting force acts between the magnetic attraction plate and the rotor magnet. This may possibly cause the magnetic attraction plate to be detached from the base frame. It is sometimes the case that the planar portion of the magnetic attraction plate and the flat surface of the base frame are bonded to each other with an insufficient bonding force. Thus, a need has existed to increase the bonding strength of the magnetic attraction plate.

SUMMARY OF THE INVENTION

In order to overcome the problems described above, a preferred embodiment of the present invention provide a spindle motor including: a shaft arranged concentric with a central axis and extending in a vertical direction; a rotor unit arranged to rotate about the central axis, the rotor unit including a magnet arranged around the central axis; a stator unit including a base member; and a magnetic member fixed to the base member and axially opposed to the magnet.

The magnetic member includes an opposing portion axially opposed to the magnet so that a magnetic attracting force is generated between the opposing portion and the magnet and a protrusion portion protruding downwards from the opposing portion. The base member includes a recess portion, the protrusion portion of the magnetic member being fixed within the recess portion.

With the preferred embodiment of the present invention, the protrusion portion is fixed within the recess portion, which makes it possible to increase the fixing strength of the magnetic member to the base member.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 5A and 5B are sectional views of major parts of one modified example of the spindle motor taken along the plane containing the central axis thereof, wherein FIG. 5A shows an attraction yoke and the surrounding structure thereof and FIG. 5B illustrates the relationship between the attraction yoke and the recess portion of a base member.

FIGS. 6A and 6B are sectional views of major parts of another and a further modified examples of the spindle motor taken along the plane containing the central axis thereof, wherein FIG. 6A shows an attraction yoke having an opposing portion and a protrusion portion protruding from the radial middle area of the opposing portion and FIG. 6B illustrates an attraction yoke having an opposing portion and protrusion portions protruding respectively from the radial inner and outer edges of the opposing portion.

DETAILED DESCRIPTION OF THE PREFERRED EMBODIMENTS

Hereinafter, preferred embodiments of the present invention will be described with reference to the accompanying drawings. In describing the shape and positional relationship of individual members, the direction extending along a central axis A will be referred to as a vertical direction, the side at which a rotor unit 4 lies will be called "upper" and the side at which a stator unit 3 lies will be called "lower". This definition is merely for the sake of convenience in description and is not intended to limit the posture of a spindle motor or a disk drive apparatus when they are actually attached in place.

Figure 1:
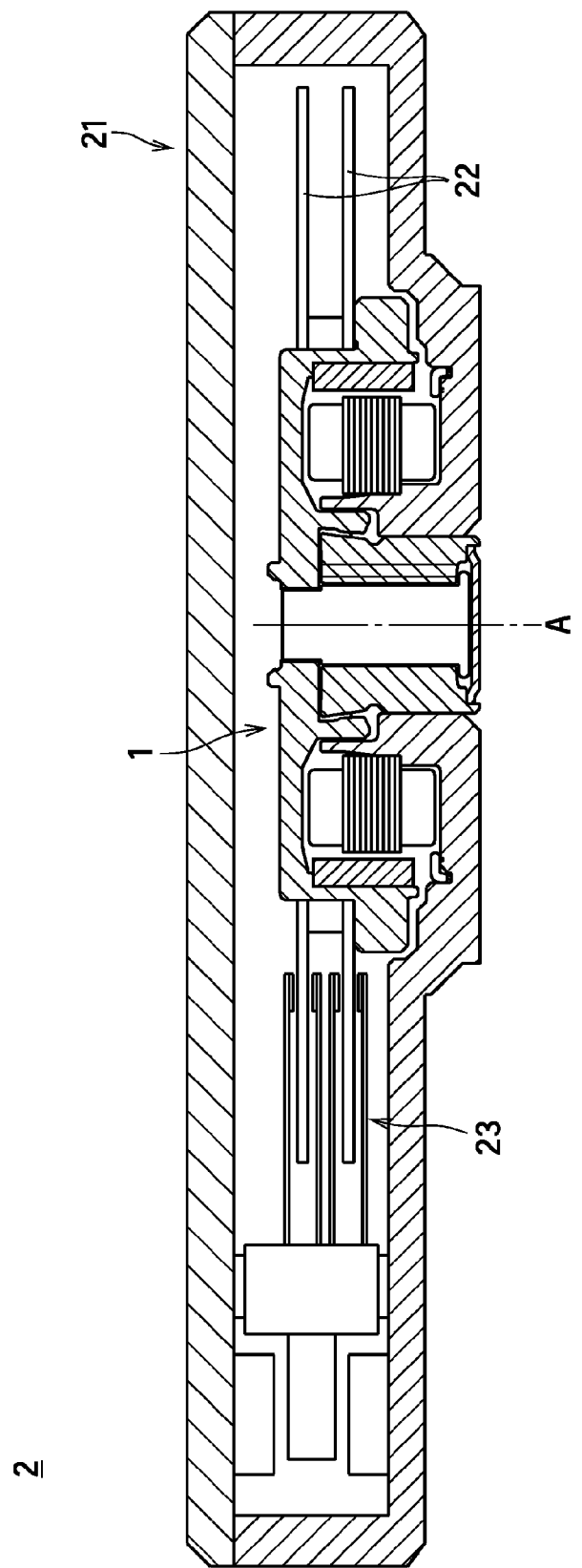
FIG. 1 is a sectional view of a disk drive apparatus taken along a plane containing a central axis thereof.

FIG. 1 is a sectional view of a disk drive apparatus 2 in accordance with a preferred embodiment of the present invention, which is taken along a plane containing a central axis thereof. Preferably, the disk drive apparatus 2 is a hard disk drive arranged to read and/or write information from and/or on, e.g., two magnetic disks 22, while rotating the latter. As shown in FIG. 1, the disk drive apparatus 2 preferably includes an apparatus housing 21, two magnetic disks (hereinafter simply referred to as "disks") 22, an access unit 23 and a spindle motor 1.

Figure 2:
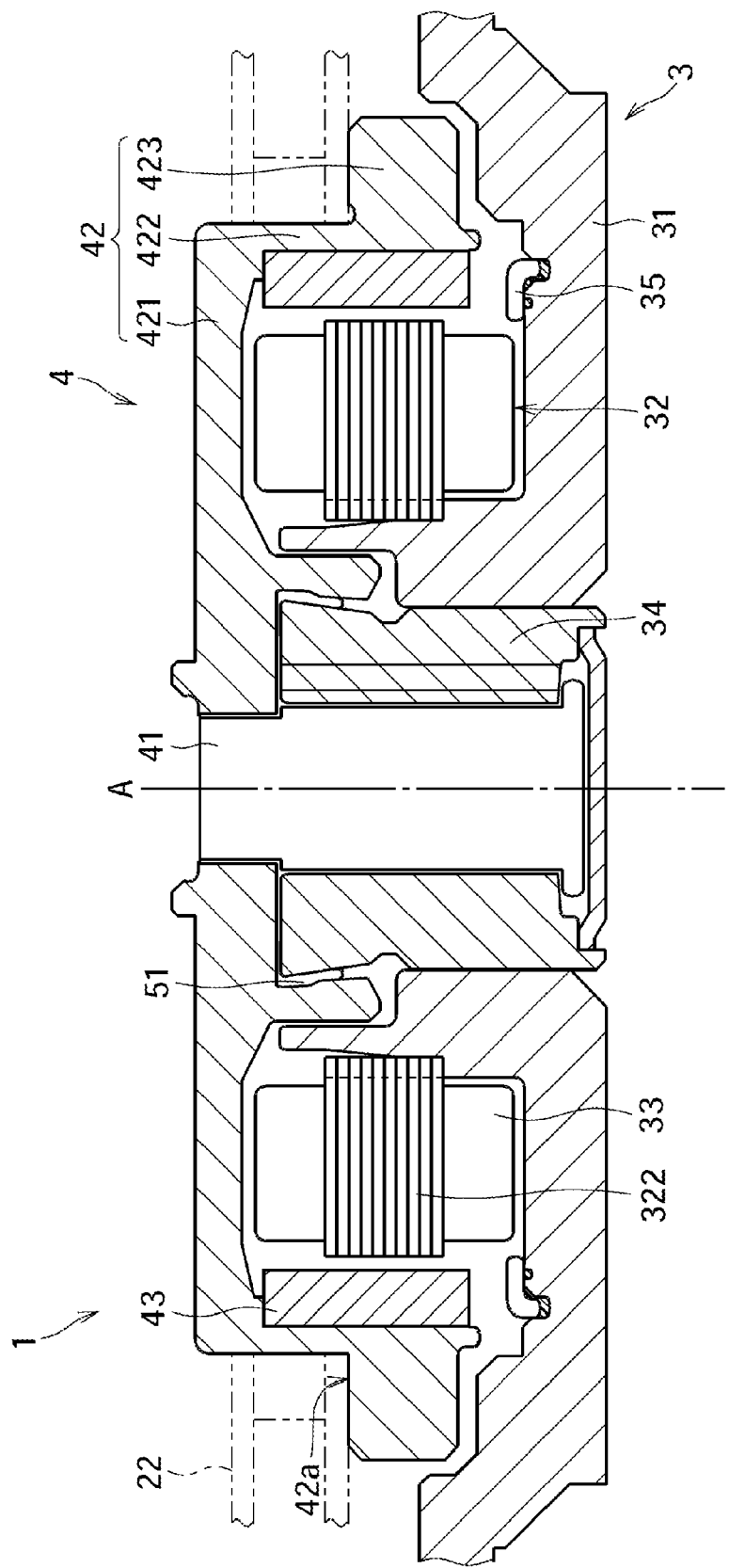
FIG. 2 is a sectional view of a spindle motor taken along a plane containing a central axis thereof.

Description will now be made on the detailed configuration of the spindle motor 1. FIG. 2 is a sectional view of the spindle motor 1 taken along a plane containing a central axis thereof. As shown in FIG. 2, the spindle motor 1 preferably includes a stator unit 3 fixed to the apparatus housing 21 of the disk drive apparatus 2 and a rotor unit 4 arranged to hold the disks 22 and rotate about a central axis A.

The configuration of the stator unit 3 will be described first. The stator unit 3 preferably includes a base member 31, a stator 32, a coil 33, a sleeve 34 and an attraction yoke 35. In the present preferred embodiment, the attraction yoke 35 is an annular magnetic member.

The base member 31 constitutes a portion of the apparatus housing 21 (see FIG. 1). The stator 32 is attached to the base member 31. The stator 32 is preferably provided with a plurality of tooth portions 322 protruding radially outwards. The coil 33 includes a conductive wire wound on the respective tooth portions 322.

The sleeve 34 is a substantially cylindrical member arranged around a shaft 41. The sleeve 34 is fixed to the base member 31.

A lubricant 51 is continuously filled in a minute gap (of, e.g., about several micrometers in size) defined between the inner circumferential surface 34a of the sleeve 34 and the outer circumferential surface 41a of the shaft 41.

The attraction yoke 35 is fixed to the upper surface of the base member 31 in an axially opposing relationship with a rotor magnet 43 to be set forth below. The attraction yoke 35 attracts the rotor unit 4 toward the stator unit 3 using a magnetic attracting force generated between itself and the rotor magnet 43, thereby stabilizing the rotation posture of the rotor unit 4.

The attraction yoke 35 is made of a magnetic material such as an electromagnetic steel plate (e.g., a silicon steel plate), a ferromagnetic stainless steel plate (e.g., a SUS430 plate), a cold-rolled steel plate (e.g., a SPCC plate or a SPCE plate) and the like. If necessary, the surface of the attraction yoke 35 is subjected to electroless nickel plating in an effort to prevent the attraction yoke 35 from gathering rust.

Next, description will be made on the configuration of the rotor unit 4 of the spindle motor 1. The rotor unit 4 preferably includes the shaft 41, a hub 42 and a rotor magnet 43.

The shaft 41 is a member arranged to extend along the central axis A. The shaft 41 is inserted into the sleeve 34 (namely, the bearing hole of the sleeve 34) and is rotatably supported by the sleeve 34.

The hub 42 is a member fixed to the shaft 41 for rotation therewith about the central axis A.

The hub 42 preferably includes a body portion 421, a cylinder portion 422 and a flange portion 423. The body portion 421 is jointed to the outer circumferential surface of the upper portion of the shaft 41 and extends radially outwards. The cylinder portion 422 extends downwards from the outer edge of the body portion 421. The flange portion 423 extends radially outwards from the lower end of the cylinder portion 422. The flange portion 423 has an upper surface 42a serving as a disk support surface on which the lowermost one of the disks 22 is placed.

The rotor magnet 43 is attached to the inner circumferential surface of the cylinder portion 422 of the hub 42. The rotor magnet 43 has an annular shape to surround the central axis A. The inner circumferential surface of the rotor magnet 43 includes a magnetic pole surface, which has N-poles and S-poles alternately arranged along the same, and is radially opposed to the outer circumferential surfaces of the tooth portions 322 of the stator 32. The lower surface of the rotor magnet 43 is axially opposed to the upper surface of the attraction yoke 35 fixed to the upper surface of the base member 31.

With the spindle motor 1 described above, radially-flowing magnetic flux is generated in the tooth portions 322 of the stator 32 if a drive current is applied to the coil 33 of the stator unit 3. Circumferentially-acting torque is then generated under the action of the magnetic flux between the tooth portions 322 and the rotor magnet 43, causing the rotor unit 4 to rotate about the central axis A with respect to the stator unit 3. The disks 22 mounted to the hub 42 are rotated about the central axis A together with the shaft 41 and the hub 42.

Figure 3:
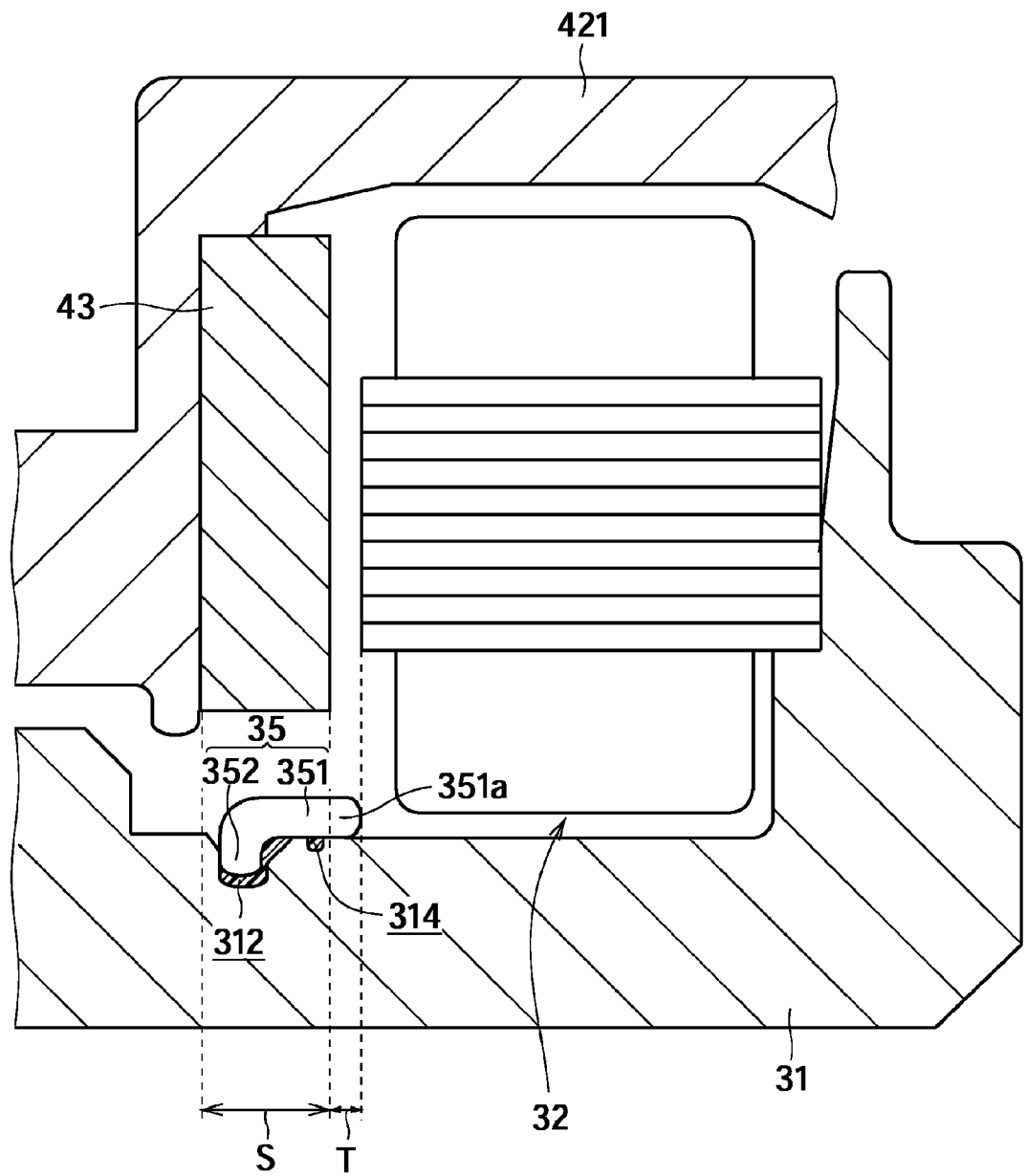
FIG. 3 is an enlarged sectional view of the spindle motor taken along the plane containing the central axis thereof, showing an attraction yoke and the surrounding structure thereof.
Figure 4:
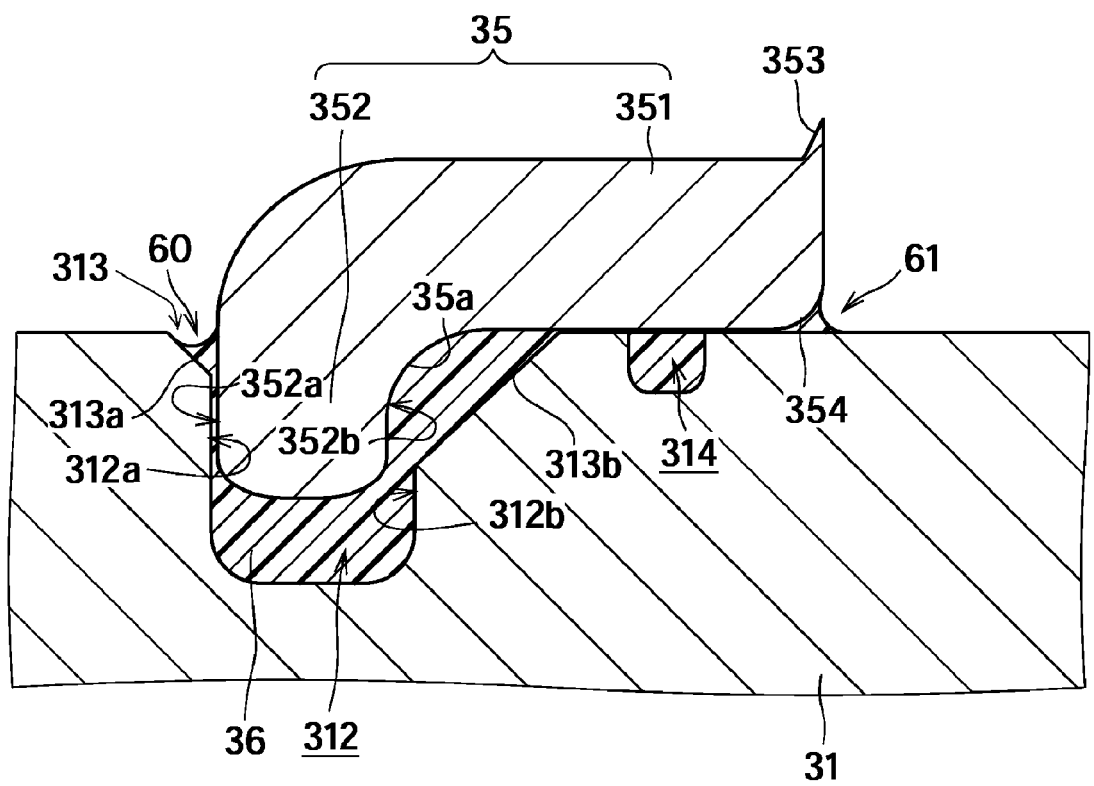
FIG. 4 is an enlarged sectional view of the spindle motor taken along the plane containing the central axis thereof, showing the relationship between the attraction yoke and the recess portion of a base member.

Next, a means for fixing the attraction yoke 35 to the base member 31 will be described with reference to FIGS. 3 and 4. FIG. 3 is an enlarged sectional view of the spindle motor 1 taken along the plane containing the central axis thereof, showing the attraction yoke 35 and the surrounding structure thereof. FIG. 4 is an enlarged sectional view of the spindle motor 1 taken along the plane containing the central axis thereof, showing the relationship between the attraction yoke 35 and the recess portion 312 of the base member 31.

The attraction yoke 35 is formed by subjecting the aforementioned magnetic steel plate to plastic deformation processing such as burring or the like. An opposing portion 351 and a protrusion portion 352 are provided in the attraction yoke 35 through the plastic deformation processing. The opposing portion 351 is axially opposed to the rotor magnet 43. A magnetic attracting force acts axially between the opposing portion 351 and the rotor magnet 43. The protrusion portion 352 protrudes downwards from the radial outer edge of the opposing portion 351. In the present preferred embodiment, the protrusion portion 352 is also axially opposed to the rotor magnet 43.

Use of this configuration makes it possible to increase the strength of the attraction yoke 35, as compared to the conventional attraction yoke having a flat shape. Therefore, it becomes possible to reduce the thickness of the attraction yoke 35.

Provision of the protrusion portion 352 makes it possible for a worker to easily handle the attraction yoke 35 having a reduced thickness. The worker can lift up the attraction yoke 35 by gripping the protrusion portion 352 just like a handle. This assists in enhancing the productability of the spindle motor 1 with the attraction yoke 35.

In the present preferred embodiment, a recess portion 312 is provided on the upper surface of the base member 31. The recess portion 312 is formed in the area S (see FIG. 3) of the base member 31 defined by axially projecting the rotor magnet 43 on the base member 31. The magnetic force of the rotor magnet 43 acts particularly strongly in the area S. If the attraction yoke 35 is bonded to the area S of the base member 31 with reduced bonding strength, there is a possibility that the attraction yoke 35 may be detached by the magnetic attracting force of the rotor magnet 43.

In the present preferred embodiment, the recess portion 312 is formed in the area S. An adhesive agent is applied to the recess portion 312, which means that the recess portion 312 serves as an adhesive agent reservoir. Increased bonding strength can be attained by fixing the protrusion portion 352 of the attraction yoke 35 within the recess portion 312. The protrusion portion 352 of the attraction yoke 35 is adhesively fixed within the recess portion 312 in the radial direction as well as in the axial direction. As compared to the conventional case, this provides bonding strength great enough to resist the magnetic attracting force of the rotor magnet 43.

When the protrusion portion 352 of the attraction yoke 35 is fixed within the recess portion 312 of the base member 31, the radial inner end portion 351a of the opposing portion 351 of the attraction yoke 35 extends into the area T defined by axially projecting the radial gap between the rotor magnet 43 and the stator 32 on the base member 31. A magnetic force is most intensively generated in the radial gap between the rotor magnet 43 and the stator 32. Even though the attraction yoke 35 has a reduced thickness, it becomes possible for the attraction yoke 35 to capture the magnetic flux flowing downwards from the rotor magnet 43 by extending the opposing portion 351 of the attraction yoke 35 to the area T. This makes it possible to prevent leakage of the magnetic flux.

As the adhesive agent 36, it is possible to use, e.g., a thermosetting adhesive agent. Alternatively, an adhesive agent with ultraviolet curability and thermosetting property or an adhesive agent having one or more of a anaerobi property, an ultraviolet curing property and a thermosetting property may be used as the adhesive agent 36.

Use of the adhesive agent with ultraviolet curability and thermosetting property makes it possible to preliminarily cure the adhesive agent by the irradiation of ultraviolet rays and then to finally cure the adhesive agent over time.

This makes it possible to perform the fixing operation of the attraction yoke 35 without having to increase the time required in manufacturing the spindle motor 1. If an adhesive agent containing a lot of epoxy component is used as the adhesive agent 36, it is possible to further increase the bonding strength of the base member 31 and the attraction yoke 35.

The recess portion 312 can have various axial and radial dimensions. For example, the axial and radial dimensions of the recess portion 312 may be such that the recess portion 312 can somewhat loosely receive the protrusion portion 352 when the protrusion portion 352 is inserted into the recess portion 312 and the opposing portion 351 of the attraction yoke 35 is brought into contact with the upper surface of the base member 31 near the recess portion 312. In addition, the axial and radial dimensions of the recess portion 312 may be such that the wall surfaces of the recess portion 312 and the corresponding surfaces of the protrusion portion 352 can be bonded together by the adhesive agent 36 or such that the bottom surface of the recess portion 312 and the lower surface of the protrusion portion 352 can be bonded together by the adhesive agent 36.

The attraction yoke 35 is fixed to the base member 31 by inserting the protrusion portion 352 of the attraction yoke 35 into the recess portion 312 applied with the adhesive agent 36 and curing the adhesive agent 36 thermally or through the irradiation of ultraviolet rays. This configuration ensures that the bonding force with which the attraction yoke 35 is bonded to the base member 31 acts around the protrusion portion 352 of the attraction yoke 35. As a result, the positioning and fixing of the attraction yoke 35 with respect to the base member 31 is performed by the protrusion portion 352 as well as by the surface-to-surface bonding between the opposing portion 351 of the attraction yoke 35 and the base member 31.

As compared to the conventional case, therefore, it is possible to increase the bonding strength of the attraction yoke 35 to the base member 31 and the strength against radially-acting impacts or vibrations. In addition, it is possible to prevent the attraction yoke 35 from being detached from the base member 31.

In the conventional case, the area of the magnetic attraction plate is widened in order to secure the bonding strength when bonding the planar surfaces of the base frame and the magnetic attraction plate. The widened area of the magnetic attraction plate results in reduction in rigidity in case where the magnetic attraction plate is made thin. This makes it difficult to reduce the thickness of the magnetic attraction plate. In the present preferred embodiment, however, it is possible to reduce the thickness of the attraction yoke 35 while securing the rigidity thereof. This allows the base member 31 to be made thicker than the conventional one, which makes it possible to increase the rigidity of the base member 31.

The radial outer surface 352a of the protrusion portion 352 of the attraction yoke 35 is bonded to the outer wall surface 312a of the recess portion 312 of the base member 31 by the adhesive agent 36. In this connection, it is preferred that the radial dimension of the adhesive agent 36 interposed between the outer surface 352a and the outer wall surface 312a is equal to or smaller than about 1 mm. As stated above, the outer surface 352a rather than the inner surface 352b contributes to the radial positioning of the attraction yoke 35. This makes it possible to determine the radial position of the attraction yoke 35 relative to the base member 31 with increased accuracy. Furthermore, the opposing portion 351 of the attraction yoke 35 comes into contact with the upper surface of the base member 31 directly or through the adhesive agent 36. This makes it possible to attach the attraction yoke 35 to the base member 31 with no occurrence of tilt.

Next, the adhesive agent 36 will be described with reference to FIG. 4. Beveled portions 313 are provided near the edges of the upper opening of the recess portion 312. As shown in FIG. 4, the radial outer beveled portion is designated by "313a" and the radial inner beveled portion is designated by "313b". The lower surface of the attraction yoke 35 makes contact with the upper surface of the base member 31 adjacent to the radial inner beveled portion 313b directly or through the adhesive agent 36.

The radial outer beveled portion 313a will be described first. As the protrusion portion 352 of the attraction yoke 35 is inserted into the recess portion 312 applied with or filled with the adhesive agent 36, the adhesive agent 36 is squeezed by the insertion force of the protrusion portion 352 so that it can come into the gap between the outer surface 352a of the protrusion portion 352 and the outer wall surface 312a of the recess portion 312 and the gap between the inner surface 352b of the protrusion portion 352 and the inner wall surface 312b of the recess portion 312. Simultaneously, the adhesive agent 36 flows upwards through the gaps mentioned above.

At this time, the adhesive agent 36 squeezed out from the gap between the outer surface 352a of the protrusion portion 352 and the outer wall surface 312a of the recess portion 312 stays in the gap between the outer surface 352a of the protrusion portion 352 and the beveled portion 313a of the recess portion 312. An internal taper portion 60 becoming gradually wider from the lower side toward the upper side is provided in the gap between the outer surface 352a of the protrusion portion 352 and the beveled portion 313a of the recess portion 312. The adhesive agent 36 flowing into the internal taper portion 60 is kept in a meniscus shape within the internal taper portion 60 under the action of a capillary force (or a surface tension). In this manner, the adhesive agent 36 is held in the internal taper portion 60 and is, therefore, prevented from leakage. By allowing the adhesive agent 36 to be cured in the internal taper portion 60, it is possible to further increase the bonding strength of the attraction yoke 35 to the base member 31. This makes it possible to provide a highly reliable spindle motor 1.

Since the attraction yoke 35 is bent by plastic deformation processing, an internal angle portion 35a between the opposing portion 351 and the protrusion portion 352 has a substantially curved shape rather than a right-angle shape. If the periphery of the upper opening of the recess portion 312 has a right-angle shape, it would make contact with the internal angle portion 35a. For avoidance of such contact, the inner beveled portion 313b is provided near the periphery of the upper opening of the recess portion 312. The adhesive agent 36 is held in the space defined by the internal angle portion 35a and the inner beveled portion 313b. Thus, the space serves as an adhesive agent reservoir.

A second recess portion 314 is provided in the area of the base member 31 defined by axially projecting the opposing portion 351 of the attraction yoke 35 on the base member 31. The second recess portion 314 holds in place a portion of the adhesive agent 36 existing between the lower surface of the opposing portion 351 and the upper surface of the base member 31.

The second recess portion 314 is a space that holds the adhesive agent 36 between the upper surface of the base member 31 and the lower surface of the opposing portion 351 of the attraction yoke 35 even when the upper and lower surfaces are kept in close contact with each other. Presence of the second recess portion 314 ensures that the adhesive agent 36 is held between the base member 31 and the attraction yoke 35 in a quantity larger than available in the conventional case. In the spindle motor 1 of the present preferred embodiment, therefore, the base member 31 and the attraction yoke 35 are fixed together with increased bonding strength. This prevents the attraction yoke 35 from being detached from the base member 31.

The second recess portion 314 serves as a reservoir arranged to gather the adhesive agent 36 that overflows when the protrusion portion 352 is inserted into the recess portion 312. Thus, the second recess portion 314 is capable of preventing the overflowed adhesive agent 36 from being leaked to the outside. Presence of the second recess portion 314 helps minimize, within the necessary extent, the thickness of the adhesive agent 36 existing between the opposing portion 351 and the base member 31.

Even when the adhesive agent 36 does not exist between the opposing portion 351 and the base member 31, it is still possible to bond the opposing portion 351 and the base member 31 together by filling the second recess portion 314 with the adhesive agent 36. In the spindle motor 1 of the present preferred embodiment, therefore, the base member 31 and the attraction yoke 35 are fixed together with increased bonding strength. This prevents the attraction yoke 35 from being detached from the base member 31.

In case where the attraction yoke 35 is produced by punching, a punching-caused upstanding portion 353 (called a "burr") is provided in the peripheral edge of one surface of the opposing portion 351 of the attraction yoke 35 and a punching-caused curved surface portion 354 (called a "sag") is provided in the peripheral edge of the other surface of the opposing portion 351 of the attraction yoke 35.

In the present preferred embodiment, the attraction yoke 35 is arranged so that the upstanding portion 353 can be positioned on the upper surface, with the curved surface portion 354 positioned on the lower surface. Therefore, an external taper portion 61 is provided between the curved surface portion 354 of the opposing portion 351 of the attraction yoke 35 and the upper surface of the base member 31. The squeezed-out adhesive agent 36 is held in the external taper portion 61 by a capillary force (or a surface tension). This further increases the bonding strength of the base member 31 and the attraction yoke 35.

The adhesive agent 36 is applied or filled in the recess portion 312 of the base member 31. If the protrusion portion 352 of the attraction yoke 35 is inserted into the recess portion 312, the adhesive agent 36 tends to overflow by a quantity corresponding to the volume of the protrusion portion 352. However, the adhesive agent 36 is held in the internal taper portion 60 and the external taper portion 61 and is prevented from being leaked to the outside. The quantity of the adhesive agent 36 applied into the recess portion 312 is such that, even if the adhesive agent 36 overflows, it can be held in the internal taper portion 60 and the external taper portion 61. The bonding strength can be further increased by curing the adhesive agent 36 in the internal taper portion 60 and the external taper portion 61.

Figure 5A:
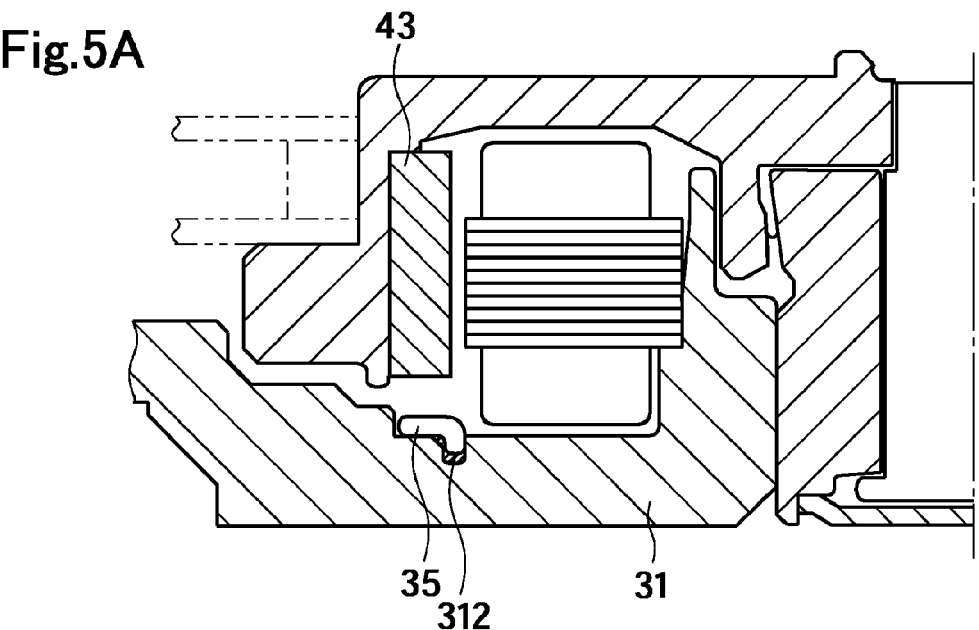
Figure 5B:
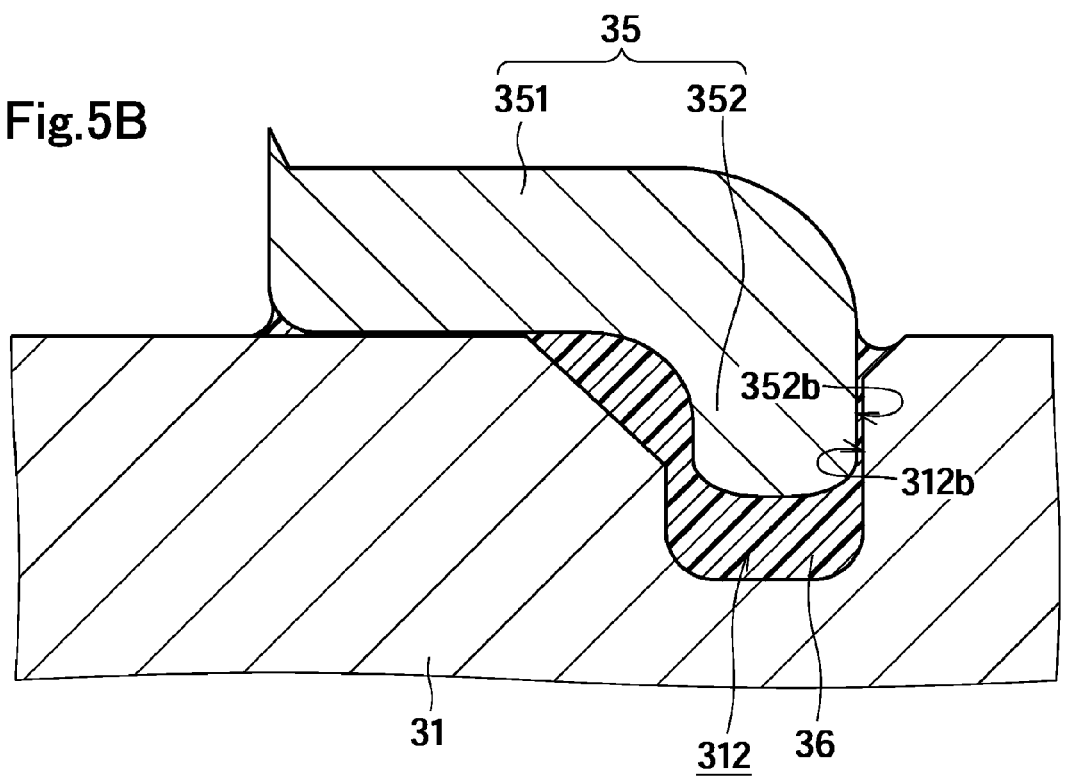

Next, one modified example of the spindle motor will be described with reference to FIGS. 5A and 5B. The protrusion portion 352 protrudes downwards from the radial inner edge of the opposing portion 351. The radial inner surface 352b of the protrusion portion 352 may be bonded to the inner wall surface 312b of the recess portion 312 of the base member 31 by the adhesive agent 36.

Figure 6A:
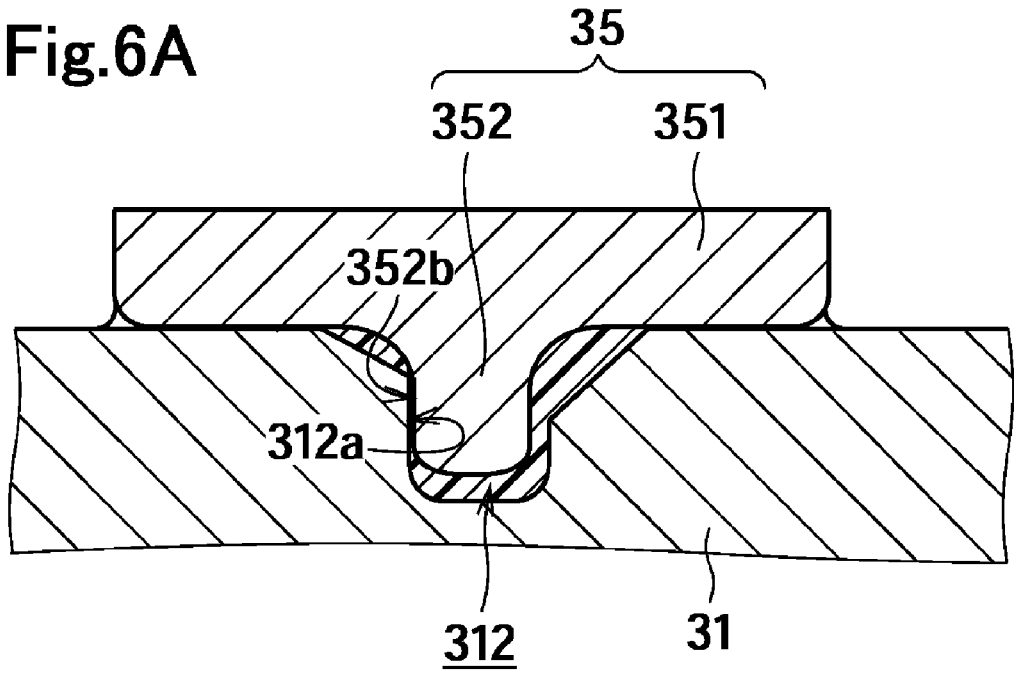

As another modified example, the protrusion portion 352 may protrude downwards from the radial middle area of the opposing portion 351 as illustrated in FIG. 6A.

Figure 6B:
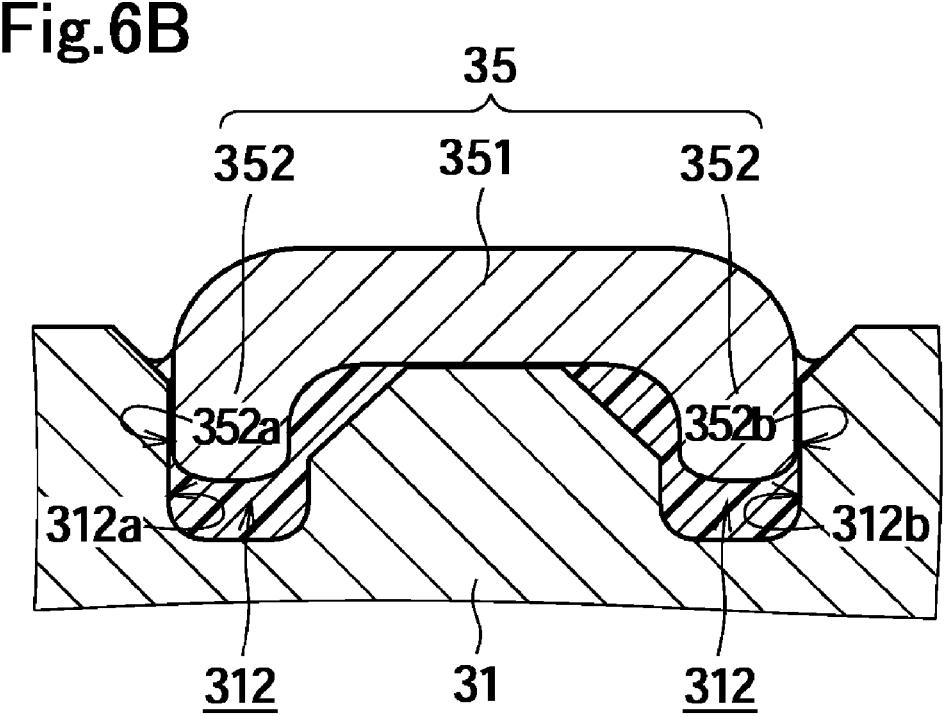

As a further modified example, two protrusion portions 352 may protrude downwards from the radial inner and outer edges of the opposing portion 351 as shown in FIG. 6B. In this case, two recess portions 312 are provided in the base member 31. No particular restriction is imposed on the number of the protrusion portions 352 and the number of the recess portions 312. In any event, the radial outer surface 352a or the radial inner surface 352b of the protrusion portions 352 is bonded to the outer wall surface 312a or the inner wall surface 312b of the recess portions 312. Use of this configuration makes it possible to determine the radial position of the attraction yoke 35 with increased accuracy.

Figure 7:
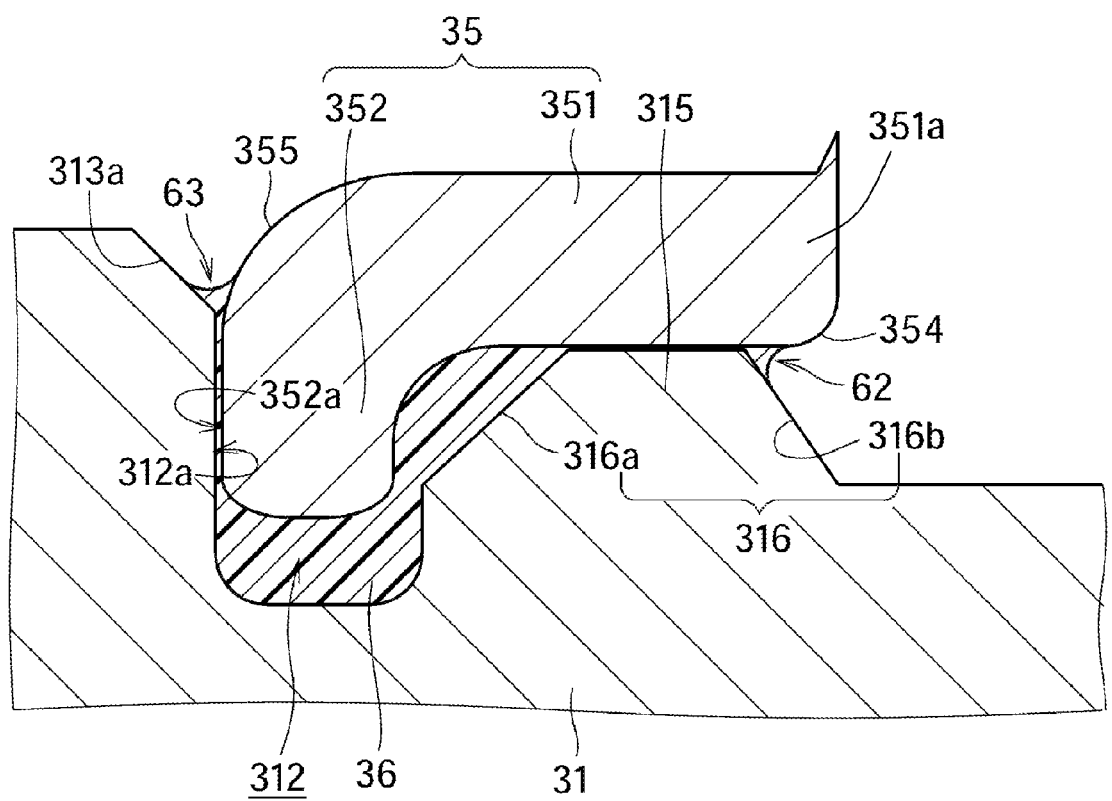
FIG. 7 is a sectional view of major parts of a sill further modified example of the spindle motor taken along the plane containing the central axis thereof.

As a still further modified example, it may be possible to provide a base bulge portion 315 protruding upwards from the portion of the base member 31 adjacent to the recess portion 312 as illustrated in FIG. 7. The upper surface of the base bulge portion 315 supports the lower surface of the opposing portion 351 of the attraction yoke 35. Slant surface portions 316 are respectively provided in the radial inner and outer edges of the upper surface of the base bulge portion 315. In this regard, the slant surface portion provided on the radial outer side is designated by "316a" and the slant surface portion provided on the radial inner side is designated by "316b".

The radial outer slant surface portion 316a of the base bulge portion 315 may be flush with the inner beveled portion 313b of the recess portion 312 described above in respect of the preferred embodiment.

As shown in FIG. 7, the opposing portion 351 of the attraction yoke 35 supported on the upper surface of the base bulge portion 315 extends radially inwards beyond the upper surface of the base bulge portion 315 and terminates at the radial inner end portion 351a (or a curved surface portion 354). A taper portion 62 is defined by the radial inner end portion 351a (or the curved surface portion 354) and the inner slant surface portion 316b of the base bulge portion 315. Therefore, the adhesive agent 36 leaked radially inwards from the gap between the lower surface of the opposing portion 351 and the upper surface of the base bulge portion 315 is held in the taper portion 62 by a capillary force. By curing the adhesive agent 36 in the taper portion 62, it is possible to further increase the bonding strength of the attraction yoke 35 to the base member 31.

By extending the outer wall surface 312a of the recess portion 312 upwards, the bonding area thereof to the outer surface 352a of the protrusion portion 352 can be increased.

A second curved surface portion 355 is provided in the upper edge of the radial outer circumferential portion of the opposing portion 351 where the protrusion portion 352 protrudes. The second curved surface portion 355 is so named to distinguish itself from the afore-mentioned curved surface portion 354 formed by punching. The gap between the second curved surface portion 355 and the beveled portion 313a of the recess portion 312 forms a taper portion 63 becoming gradually wider from the lower side toward the upper side. The adhesive agent 36 flowing into the gap is kept in a meniscus shape in the taper portion 63 under the action of a capillary force (or a surface tension). In this manner, the adhesive agent 36 is held in the taper portion 63 and is, therefore, prevented from leakage. By allowing the adhesive agent 36 to be cured in the taper portion 63, it is possible to further increase the bonding strength of the attraction yoke 35 to the base member 31. This makes it possible to provide a highly reliable spindle motor 1.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

For example, although the second recess portion 314 is used as a reservoir holding a portion of the adhesive agent in the preferred embodiment described above, the present invention is not limited thereto. Alternatively, the protrusion portion 352 of the attraction yoke 35 may be fixed within the second recess portion 314.

Taking another example, although the attraction yoke is attached to the base member 31 ((particularly, the protrusion portion 352 of the attraction yoke 35 is attached in the recess portion 312 of the base member 31) by the adhesive agent 36 in the preferred embodiment described above, the present invention is not limited thereto. The attraction yoke 35 may be fixed to the base member 31 by a fixing means such as press-fitting, caulking or shrinkage fitting, which may be used in combination with the adhesive agent. For example, the outer surface of the protrusion portion may be press-fitted to the outer wall surface of the recess portion. In this case, the outer surface of the protrusion portion and the outer wall surface of the recess portion make direct contact with each other. The radial dimension of the protrusion portion is set a little greater than or substantially equal to the radial inner diameter of the recess portion.

The base member 31 may be configured from a plurality of members.

It may also be possible to employ a configuration in which the protrusion portion of the attraction yoke is not axially opposed to the rotor magnet.

Although the spindle motor 1 of the afore-mentioned preferred embodiment is a so-called shaft-rotating type spindle motor in which the shaft 41 rotates together with the hub 42, the present invention is not limited thereto.

As an alternative example, the spindle motor of the present invention may be a so-called shaft-fixed type spindle motor in which a sleeve and a hub make rotation relative to a shaft fixed to a base member.

What is claimed is:

1. A spindle motor comprising:
    a shaft as arranged concentric with a central axis and extending in a vertical direction;
    a rotor unit arranged to rotate about the central axis, the rotor unit including a magnet arranged around the central axis;
    a stator unit including a base member; and
    a magnetic member fixed to the base member and axially opposed to the magnet; wherein
    the magnetic member includes an opposing portion axially opposed to the magnet so that a magnetic attracting force is generated between the opposing portion and the magnet and a protrusion portion protruding downwards from the opposing portion, and the base member includes a recess portion, the protrusion portion of the magnetic member being fixed within the recess portion; and
    the recess portion is defined by a channel including two opposed wall portions extending in parallel or substantially in parallel with the central axis such that the magnetic member is sandwiched by the two opposed wall portions by being arranged directly between the two wall portions in a radial direction.

2. The spindle motor of claim 1, a radial outer surface of the protrusion portion in contact with a wall surface of the recess or is bonded to the wall surface by an adhesive agent.

3. The spindle motor of claim 2, wherein the adhesive agent is filled in the recess portion, the radial outer surface and a radial inner surface of the protrusion portion are bonded within the recess portion by the adhesive agent.

4. The spindle motor of claim 2, wherein the recess portion includes a beveled portion near an upper opening thereof, and a taper portion is provided between the protrusion portion and the beveled portion, a portion of the adhesive agent being present within the taper portion.

5. The spindle motor of claim 1, wherein a radial inner surface of the protrusion portion is in contact with a wall surface of the recess portion or is bonded to the wall surface by an adhesive agent.

6. The spindle motor of claim 5, wherein the recess portion includes a beveled portion near an upper opening thereof, and a taper portion is provided between the protrusion portion and the beveled portion, a portion of the adhesive agent being present within the taper portion.

7. The spindle motor of claim 5, wherein the recess portion includes a beveled portion near an upper opening thereof, and a taper portion is provided between the protrusion portion and the beveled portion, a portion of the adhesive agent being present within the taper portion.

8. The spindle motor of claim 1, wherein the protrusion portion is arranged to protrude downwards from at least one of a radial outer edge portion and a radial inner edge portion of the opposing portion.

9. The spindle motor of claim 8, wherein a second curved surface portion is provided in an upper edge of at least one of the radial outer edge portion and the radial inner edge portion of the opposing portion from which the protrusion portion protrudes downwards.

10. The spindle motor of claim 9, wherein an upstanding portion is provided at an opposite side to the second curved surface portion in the upper edge of at least one of the radial outer edge portion and the radial inner edge portion of the opposing portion.

11. The spindle motor of claim 1, wherein an upstanding portion is provided in an upper edge of at least one of a radial outer edge portion and a radial inner edge portion of the opposing portion, and a curved surface portion is provided in a lower edge of at least one of the radial outer edge portion and the radial inner edge portion of the opposing portion.

12. The spindle motor of claim 1, wherein the protrusion portion is axially opposed to the magnet.

13. The spindle motor of claim 1, wherein the protrusion portion protrudes downwards from a radial middle area of the opposing portion.

14. The spindle motor of claim 1, wherein the base member further includes a base bulge portion provided in a position adjacent to the recess portion, the opposing portion of the magnetic member being supported on an upper surface of the base bulge portion.

15. The spindle motor of claim 14, wherein a slant surface portion is provided in at least one of a radial outer edge portion and a radial inner edge portion of the upper surface of the base bulge portion.

16. The spindle motor of claim 1, wherein the recess portion is provided in an area of the base member defined by axially projecting the magnet on the base member.

17. The spindle motor of claim 1, wherein the recess portion is a first recess portion, and a second recess portion is provided in an area of the base member defined by an axially projecting portion of the opposing portion of the magnetic member on the base member.

18. The spindle motor of claim 1, wherein the base member further includes a hollow cylinder portion provided on a radial inner side thereof;

the stator unit further includes a stator attached to an outer circumferential surface of the cylinder portion, the stator including a coil defined by winding a conductive wire; and the magnetic member extends into an area of the base member defined by an axially projecting length of a radial gap between the magnet and the stator on the base member.

19. A disk drive apparatus arranged to read and/or write information while rotating a disk, comprising:

the spindle motor of claim 1;

an access unit arranged to read and/or write information from and/or on the disk; and a housing accommodating the spindle motor and the access unit.

* * * * *